(12) United States Patent
Asahara et al.

(10) Patent No.: US 9,163,656 B2
(45) Date of Patent: Oct. 20, 2015

(54) LIGHTNING PROTECTION FASTENER AND CAP FOR LIGHTNING PROTECTION FASTENER

(71) Applicant: MITSUBISHI AIRCRAFT CORPORATION, Aichi (JP)

(72) Inventors: Yuji Asahara, Tokyo (JP); Hideo Yamakoshi, Tokyo (JP); Atsuhiro Iyomasa, Tokyo (JP); Takeyasu Tarumi, Tokyo (JP); Wataru Nishimura, Tokyo (JP); Yasunori Watanabe, Tokyo (JP); Toru Hashigami, Aichi (JP); Hiroshi Rikukawa, Tokyo (JP); Hideo Imamura, Tokyo (JP); Naoki Taniguchi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/347,862

(22) PCT Filed: Nov. 1, 2012

(86) PCT No.: PCT/JP2012/007018
§ 371 (c)(1),
(2) Date: Mar. 27, 2014

(87) PCT Pub. No.: WO2013/065311
PCT Pub. Date: May 10, 2013

(65) Prior Publication Data
US 2014/0234050 A1    Aug. 21, 2014

(30) Foreign Application Priority Data
Nov. 4, 2011    (JP) .................................. 2011-242552

(51) Int. Cl.
*A47G 3/00*        (2006.01)
*F16B 43/00*      (2006.01)
(Continued)

(52) U.S. Cl.
CPC .............. *F16B 43/001* (2013.01); *B64D 45/02* (2013.01); *F16B 33/004* (2013.01); *F16B 37/14* (2013.01)

(58) Field of Classification Search
CPC ...... F16B 43/001; F16B 37/14; F16B 33/004; B64D 45/02
See application file for complete search history.

(56) References Cited

U.S. PATENT DOCUMENTS 972,140 A * 10/1910 Adam ............................ 411/429
2,710,113 A * 6/1955 Pritchard ...................... 220/681
(Continued)

FOREIGN PATENT DOCUMENTS

CA        2755705 A1    10/2010
GB        2163817 A       3/1986
(Continued)

OTHER PUBLICATIONS

International Search Report for Application No. PCT/JP2012/007018 dated Feb. 12, 2013.

*Primary Examiner* — Gary Estremsky
(74) *Attorney, Agent, or Firm* — Pearne & Gordon LLP

(57) ABSTRACT

To provide a lightning protection fastener or the like, that can reliably seal an arc between the cap and a member such as a wing panel. An end part 30A of a cap 30 on an opening side, the end part 30 A facing a member 22 (or member 21), includes a plane 30d orthogonal to an axis line of the cap 30A and a tapered face 30c formed on an outer circumferential side of the plane 30d. A sealant 34 that spills out of the cap 30A upon mounting the cap 30A is present between the tapered face 30c and a surface 22f of the member 22 (sealant 34S).

11 Claims, 5 Drawing Sheets

(51) Int. Cl.
  *B64D 45/02*   (2006.01)
  *F16B 37/14*   (2006.01)
  *F16B 33/00*   (2006.01)

(56) References Cited

U.S. PATENT DOCUMENTS

| | | | |
|---|---|---|---|
| 3,548,704 A | | 12/1970 | Kutryk |
| 4,826,380 A | * | 5/1989 | Henry ............................ 411/377 |
| 4,905,931 A | | 3/1990 | Covey |
| 5,175,665 A | | 12/1992 | Pegg |
| 5,752,795 A | * | 5/1998 | D'Adamo ...................... 411/429 |
| 6,135,691 A | * | 10/2000 | Nadarajah et al. ............ 411/431 |
| 6,273,658 B1 | * | 8/2001 | Patterson et al. .............. 411/431 |
| 7,438,974 B2 | * | 10/2008 | Obuhowich ................... 428/346 |
| 2009/0147429 A1 | | 6/2009 | Martin Hernandez |
| 2011/0226896 A1 | * | 9/2011 | Bessho et al. ................. 244/1 A |
| 2012/0219380 A1 | * | 8/2012 | Hutter, III ...................... 411/377 |
| 2013/0043351 A1 | * | 2/2013 | Kamihara et al. ............. 244/132 |

FOREIGN PATENT DOCUMENTS

| | | |
|---|---|---|
| JP | 64-3308 A | 1/1989 |
| JP | 2-7398 A | 1/1990 |
| JP | 2010-254287 A | 11/2010 |
| JP | 2011-98675 A | 5/2011 |
| JP | 2011-195114 A | 10/2011 |

* cited by examiner

LIGHTNING PROTECTION FASTENER AND CAP FOR LIGHTNING PROTECTION FASTENER

BACKGROUND OF THE INVENTION

1. Field of the Invention

The present invention relates to a lightning protection fastener for use in an airframe of an aircraft, in particular, in a wing, and relates to a cap for a lightning protection fastener.

2. Description of the Related Art

In general, each of wings for constituting an airframe of an aircraft has a hollow structure, and each of wing panels forming the wing surface is secured to a structural member located inside of the wing with a fastener member (a fastener).

The fastener member includes a pin-shaped fastener main body and a fastening member (collar). The fastener member fastens the wing panel and the structural member with each other through processes in which, by inserting the fastener main body into through-holes formed in both of the wing panel and the structural member located inside the wing from the outside of the wing and by securing its tip portion by using the fastening member from the inside of the wing.

Moreover, in addition to these, with respect to the wing inner portions and the fuselage portions, structural members other than the wing panels and securing members for equipments are also fastened and secured by the fastener members.

In this case, the fastener member fastens two members through processes in which, by inserting a pin-shaped fastener main body into through-holes formed in both of the members to be secured to each other and by securing its tip portion by using a fastening member (collar).

Additionally, the wing panels or members to be secured are not limited to two.

On the other hand, in the aircraft, it is necessary to provide thoroughgoing countermeasures against a lightning strike for explosion proof. Upon occurrence of a lightning strike in an aircraft, a large current flows through a wing panel such as a main wing, or a structural member, or the like. In this case, part of or whole of the large current flows through the portion fastened by the fastener main body and the fastening member depending on cases. When the current value exceeds a limited value of a passage permissible current in each of the fastened portions, a discharge referred to as an electric arc (or a thermal spark) is generated (hereinafter, referred to as "arc" in the present specification). This is a phenomenon in which an abrupt temperature rise occurs in the fastened interface between members mainly composed of conductive members constituting the fastened portion due to a current passing through the fastened portion, with the result that the members are locally fused to cause a discharge in the air in the vicinity thereof. In most cases, scattering fused matters, referred to as "hot particles", are generated from the fused portion. In general, since the inner space of a wing is compatibly used as a fuel tank, it is necessary to provide explosion-preventive measures. Therefore, at the time of a lightning strike, by suppressing the generation of an arc or sealing the arc, arc discharge needs to be prevented, and the scattered hot particles are prevented from contacting a combustible fuel vapor, for prevention of ignition. Here, portions at which a combustible fuel vapor might exist include the inside of each of fuel tanks in the wings and fuselage, the inside of a surge tank (a tank where a bent scoop, a burst disk, and the like are placed), which is placed on the wing tip side of the fuel tank, the inside of each of fuel system equipments, etc.

Therefore, as shown in FIGS. 5A to 5E, a structure has been proposed in which a cap 3, made of an insulating material, is attached so as to cover the tip 1a of the fastener member 1 and the metal fastener 2 fastened to the fastener member 1, and a sealant 4 is filled in the cap 3 so as to seal gaps among the tip 1a of the fastener member 1, the metal fastener 2 and the cap 3 (see Patent Literature 1 (JP-A No. 2010-254287).

In a fastening work site in which the fastener member 1 is used, as shown in FIG. 5A, upon attaching the cap 3 to the tip 1a of the fastener member 1 and the metal fastener 2, the sealant 4 is preliminarily filled into the inner space of the cap 3. Then, as shown in FIG. 5B, the cap 3, filled with the sealant 4, is mounted on the tip 1a of the fastener member 1 and the metal fastener 2. Consequently, an excessive sealant 4 inside the cap 3 spills out of an opening of the cap 3. As shown in FIG. 5C, in the case when the end face 3a on the opening side of the cap 3 is pressed onto the surface of the member 5 such as a wing panel, the spilled-out sealant 4 is present between the cap 3 and the member 5, and located on the outer circumferential side of the cap 3 in a raised ring shape, so that an arc is sealed in the interface between the cap 3 and the member 5.

SUMMARY OF THE INVENTION

The above-mentioned sealant 4 has a high viscosity. For this reason, when, in the last stage for mounting the cap 3, the gap between the end face 3a on the opening side of the cap 3 and the member 5 such as a wing panel becomes small, the sealant 4 is hardly allowed to spill out of the cap 3 through this portion, with the result that the pressure of the sealant 4 held between the cap 3 and the member 5 such as a wing panel becomes higher.

Moreover, since the sealant 4 also has elasticity together with viscosity, a problem arises in which, even when the cap 3 is pushed onto the member 5 such as a wing panel, as shown in FIG. 5D, the cap 3, thus pushed thereto, is pushed back in a direction away from the member 5 due to the pressure and resiliency.

In the case when the cap 3 is pushed back with the result that the end face 3a on the opening side of the cap 3 is separated from the member 5 such as a wing panel, a gap 7 is generated therein, failing to carry out an arc sealing process.

Moreover, in some cases, the cap 3 is raised up to cause the sealant 4 which is present between the end face of the cap 3 and the member 5 such as a wing panel to become thinner in a radial direction of the cap 3. Undesirably, this case may fail to reliably seal an arc between the cap 3 and the member 5 such as a wing panel.

Moreover, as shown in FIG. 5E, since the sealant 4S, located on the outer circumferential side of the cap 3 in a raised state with a ring shape on the member 5 such as a wing panel, is only thinly connected with the cap 3 and the sealant 4 inside the cap 3, the sealant 4S might be separated from this portion and might come off after the curing process. Here, a process is proposed in which, after the mounting process of the cap 3, the sealant 4S on the outer circumferential side is uniformly shifted toward the cap 3 side by the worker with the fingers, a spatula or the like (adjusted in its shape); however, this process is a time-consuming process and makes the quality dependent on the degree of skill or the like of the worker.

In view of these problems, the present invention has been accomplished, and its object is to provide a lightning protection fastener and a cap for the lightning protection faster that can reliably seal an arc between the cap and the member such as a wing panel, even in the case when the cap is raised up.

In order to achieve the above objects, the lightning protection fastener of the present invention includes: a fastener member having a shaft that penetrates a first member and a second member so as to fasten the second member to the first member that constitutes an airframe of an aircraft, the shaft protruding toward at least one of the sides of the first member and the second member; a cap, made of an insulating material, that is attached so as to cover the shaft of the fastener member that protrudes toward at least one of the sides of the first member and the second member; and a sealant, made of an insulating material, that is filled into the cap to seal a space between the cap and the fastener member. The cap has an opening that accommodates the shaft of the fastener member. In the lightning protection fastener of the present invention, an end part of the cap on the opening side, the end part facing the first member or the second member, includes: a plane orthogonal to an axis line of the cap and a tapered face formed on an outer circumferential side of the plane; and the sealant is filled between the tapered face and a surface of the first member, or between the tapered face and a surface of the second member.

When upon attaching the cap, the cap with the sealant filled in the inner space thereof is mounted so as to accommodate the end portion of the fastener member, the sealant spills out toward the outer circumferential side of the cap. At this time, since the tapered face is formed on the end part on the opening side of the cap, the spilled-out sealant is filled into between the surface of the first member and the tapered face or between the surface of the second member and the tapered face so that a sufficient amount of the sealant is present therebetween. Therefore, even when the cap is shifted in a direction away from the first member or the second member, the sealant is allowed to follow the shift so that an arc sealing function between the cap and the surface of the first member or the second member can be reliably exerted.

In this case, the cap may have a through-hole that penetrates the inside and outside thereof and is formed on another end part that is opposed to the opening. With this structure, when the cap with the sealant filled therein is mounted so as to accommodate the end portion of the fastener member, an excessive sealant is allowed to flow the outside of the cap from the through-hole so that it becomes possible to suppress the pressure of the sealant inside the cap from becoming higher.

When the shaft of the fastener member protrudes toward both sides of the first member and the second member, the cap may be provided on each of one end portion and another end portion of the shaft. That is, in this case, two caps are used as the aforementioned cap.

The present invention also provides a lightning protection fastener including: a fastener member having a shaft that penetrates a first member and a second member so as to fasten the second member to the first member that constitutes an airframe of an aircraft, the shaft protruding toward at least one of the sides of the first member and the second member; a cap, made of an insulating material, that is attached so as to cover the shaft of the fastener member that protrudes toward at least one of the sides of the first member and the second member; and a sealant, made of an insulating material, that is filled into the cap to seal a space between the cap and the fastener member, wherein the cap has an abut portion that abuts against the fastener member or a fastening member that is fastened to the fastener member, and a clearance is formed between the cap and a surface of the first member or between the cap and a surface of the second member while the abut portion abuts against the fastener member or the fastening member, so that the sealant is filled in the clearance.

The clearance is formed between the cap and the first member or between the cap and the second member while the abut portion abuts against the fastener member or the fastening member that is fastened to the fastener member; therefore, in the case when the cap with the sealant filled therein is mounted on the end portion of the fastener member, since the sealant spills out toward the outer circumferential side from the clearance, the pressure of the sealant is prevented from becoming higher.

Moreover, by filling the clearance with the sealant, even when the cap is shifted in a direction away from the first member or the second member, the sealant is allowed to follow the shift so that an arc sealing function between the cap and the surface of the first member or the second member can be reliably exerted.

The present invention also provides a cap for a lightning protection fastener to be attached so as to cover a tip of a fastener member that fastens a first member and a second member with each other. This cap is made of an insulating material and includes an opening for accommodating the tip of the fastener member. An end part of the cap on the opening side, the end part facing the first member or the second member, includes a plane orthogonal to an axis line of the cap and a tapered face formed on an outer circumferential side of the plane.

In accordance with the present invention, it becomes possible to reliably seal an arc between the cap and the first member such as a wing panel or between the cap and the second member, even in the case when the cap is raised up.

DETAILED DESCRIPTION OF THE PREFERRED EMBODIMENTS

The present invention will be described in detail based on embodiments illustrated in attached drawings.

[First Embodiment]

Figure 1A:
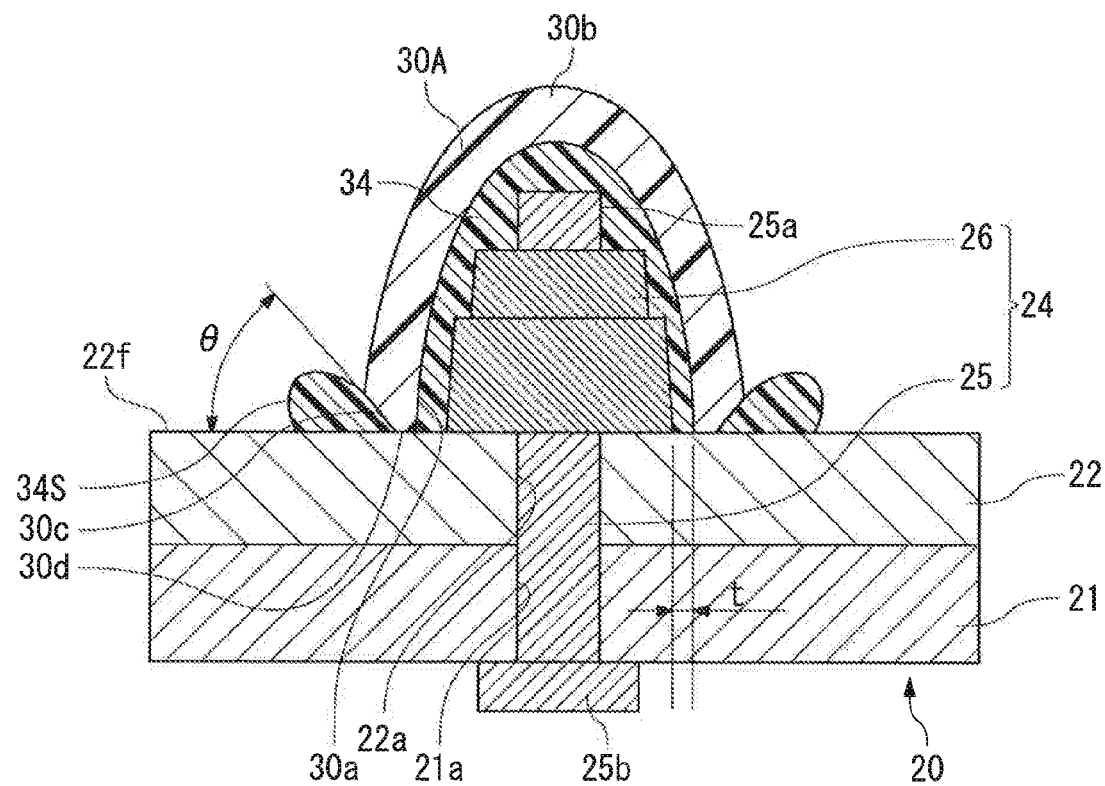
FIG. 1A is a cross-sectional view illustrating a structure of a lightning protection fastener in accordance with a first embodiment.

FIG. 1A is a cross-sectional view illustrating one portion of a wing that constitutes an airframe of an aircraft to which a lightning protection fastener in accordance with the present embodiment is applied.

As shown in FIG. 1A, a wing 20 has an outer shell formed by a wing panel (first member) 21, which is made of a CFRP (Carbon Fiber Reinforced Plastics) that is a composite material of, for example, carbon fibers and resin, or a metal material such as an aluminum alloy. Reinforcing structural members, fuel tanks and various apparatuses to be provided inside the wing 20 are secured onto the wing panel 21, with members (second members) 22, such as stays made of metal materials, such as an aluminum alloy, being interposed therebetween. Moreover, the members 22, such as stays, are secured onto the wing panel 21 by fastener members 24.

The fastener member 24 includes a fastener main body 25 having a pin shape and a collar 26 that is mounted on the fastener main body 25 inside the wing 20.

From the viewpoint of strength, the fastener main body 25 and the collar 26 are generally made of a metal material.

The pin-shaped fastener main body 25 has a screw groove (screw portion) 25a at its tip portion, and its rear end portion is formed into an enlarged diameter portion 25b having an enlarged diameter in comparison with the tip portion side. The fastener main body 25 is inserted from the outside of the wing 20 into a hole 21a formed by penetrating the wing panel 21 and a hole 22a formed by penetrating the member 22 so that its tip portion is allowed to protrude inward the wing 20, with its enlarged diameter portion 25b of the rear end portion abutting against the outer surface of the wing panel 21.

The collar 26 has a sleeve shape, with thread grooves to be engaged with the screw grooves 25a of the fastener main body 25 being formed in its inner circumferential face. The collar 26 is screwed into the screw grooves 25a of the fastener main body 25 that protrudes inward the wing 20. Thus, the wing panel 21 and the member 22 are held by the enlarged diameter portion 25b of the fastener main body 25 and the collar 26 so that the member 22 is secured onto the wing panel 21.

On the inner space side of the wing 20, a cap 30A is mounted on the fastener member 24. A sealant 34 having an insulating property is filled into the cap 30A.

Figure 1B:
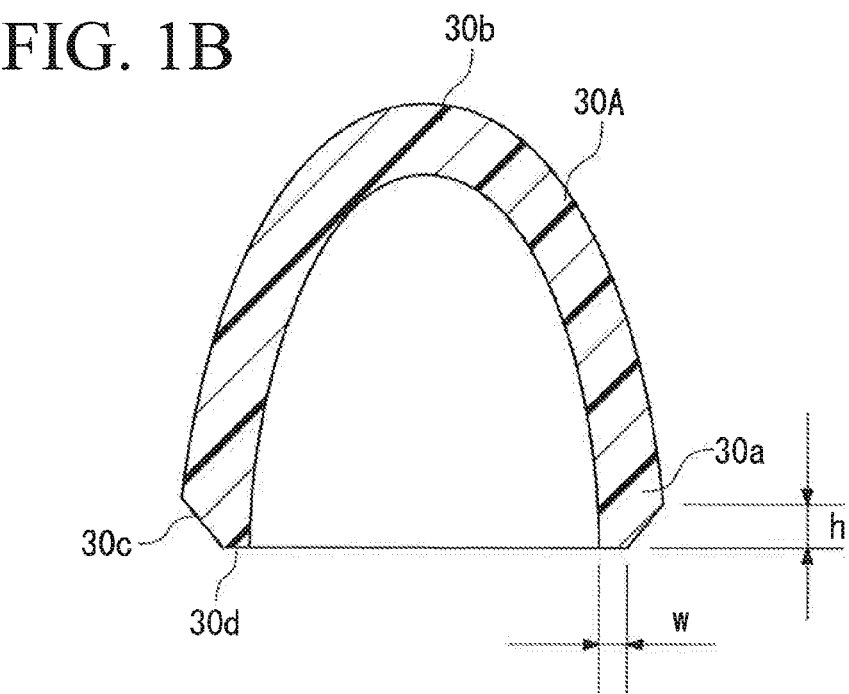
FIG. 1B is a cross-sectional view illustrating a cap in accordance with the first embodiment.

As shown in FIG. 1B, the cap 30A has an ellipsoidal longitudinal section (a round cross section) and is open only on one end part 30a side. The cap 30A has an umbrella shape, with its inner diameter and outer diameter being gradually narrowed toward the other end part 30b. As this cap 30A, a cap preliminarily prepared as a molded body by using the same kind of insulating material as that of sealant 34 may be used. For example, the cap 30A may be made of a resin having an insulating property, such as PPS (polyphenylene sulfide resin), polyimide, PEEK (polyether-ether-ketone resin), or nylon resin.

The cap 30A has a tapered face 30c that is formed on its outer circumferential edge of the one end part 30a side, with its outer diameter being gradually narrowed from the other end part 30b side toward the one end part 30a side. As shown in FIG. 1A, this tapered face 30c may be formed in a manner so as have an intersecting angle θ of about 30 to 60° relative to the surface 22f of the member 22, and when the cap 30A is viewed on a cross section taken along its axis line, the tapered face 30c may be a linear shape, or a concave shape recessed inward, or a convex shape expanded outward.

Moreover, the one end part 30a of the cap 30A has a plane 30d that is orthogonal to the axis line of the cap 30A. The tapered face 30c is formed on the outer circumferential side of the plane 30d.

In the case when the thickness of the cap 30A is, for example, 2.5 mm, the height h of the tapered face 30c is preferably set to about 1 to 2.5 mm. The width w of the plane 30d is preferably set to about 0.5 to 1.5 mm.

In the cap 30A, its inner diameter of the inner circumferential face is designed so that when the cap 30A is mounted on the faster member 24, a predetermined gap is formed between the fastener main body 25 and the collar 26. In particular, the cap 30A is formed so that in the one end part 30a corresponding to the opening side of the cap 30A, a gap having a predetermined dimension t or more is ensured between the inner circumferential face of the cap 30A and the fastener main body 25.

In a state in which the cap 30A is mounted on the fastener member 24, the sealant 34 having an insulating property is filled into the cap 30A. Since the sealant 34 is present between the inner circumferential face of the cap 30A and the fastener main body 25 and between inner circumferential face of the cap 30A and the collar 26, the insulating property between the cap 30A and the fastener member 24 is further increased. Moreover, since in the one end part 30a corresponding to the opening side of the cap 30A, the sealant 34 between the inner circumferential face of the cap 30A and the fastener main body 25/the collar 26 has a thickness that is a predetermined dimension t or more, the insulating property between the inner circumferential face of the cap 30A and the fastener main body 25/the collar 26 is ensured.

Upon mounting the cap 30A on the fastener member 24 for fastening the wing panel 21 and the member 22 to each other, an uncured sealant 34 is preliminarily filled into the cap 30A. Then, in the inside space of the wing 20, the cap 30A is pressed onto the fastener main body 25 of each fastener member 24 that protrudes inward.

At this time, the sealant 34 filled into the cap 30A has such a filled amount as to spill out of the opening of the one end part 30a of the cap 30A. In a state where the one end part 30a of the cap 30A abuts against the surface 22f of the member 22, the spilled-out sealant 34 is present respectively between the plane 30d of the one end part 30a of the cap 30A and the surface 22f of the member 22, as well as between the tapered face 30c and the surface 22f of the member 22 (hereinafter, the sealant 34 present between the tapered face 30c and the surface 22f of the member 22 is sometimes referred to also as a sealant 34B). In this case, the sealant 34 is filled between the tapered face 30c and the surface 22f of the member 22, with a sufficient amount thereof being present. Moreover, the sealant 34 is spread out in a ring shape on the outer circumferential side of the one end part 30a of the cap 30A so as to be raised to a position higher than the tapered face 30c on the surface 22f of the member 22 (hereinafter, this sealant 34 is sometimes referred to as a sealant 34S).

When the filled sealant 34 is cured, a lightning protection fastener including the fastener member 24, with the cap 30A mounted thereon, is formed.

In accordance with the above-mentioned structure, the tapered face 30c is formed on the one end part 30a of the cap 30A, with its outer diameter being gradually narrowed from the other end part 30b side toward the one end part 30a side, so that, upon mounting the cap 30A, the sealant 34B spilling out of the cap 30A is present between the tapered face 30c and the surface 22f of the member 22.

Figure 2A:
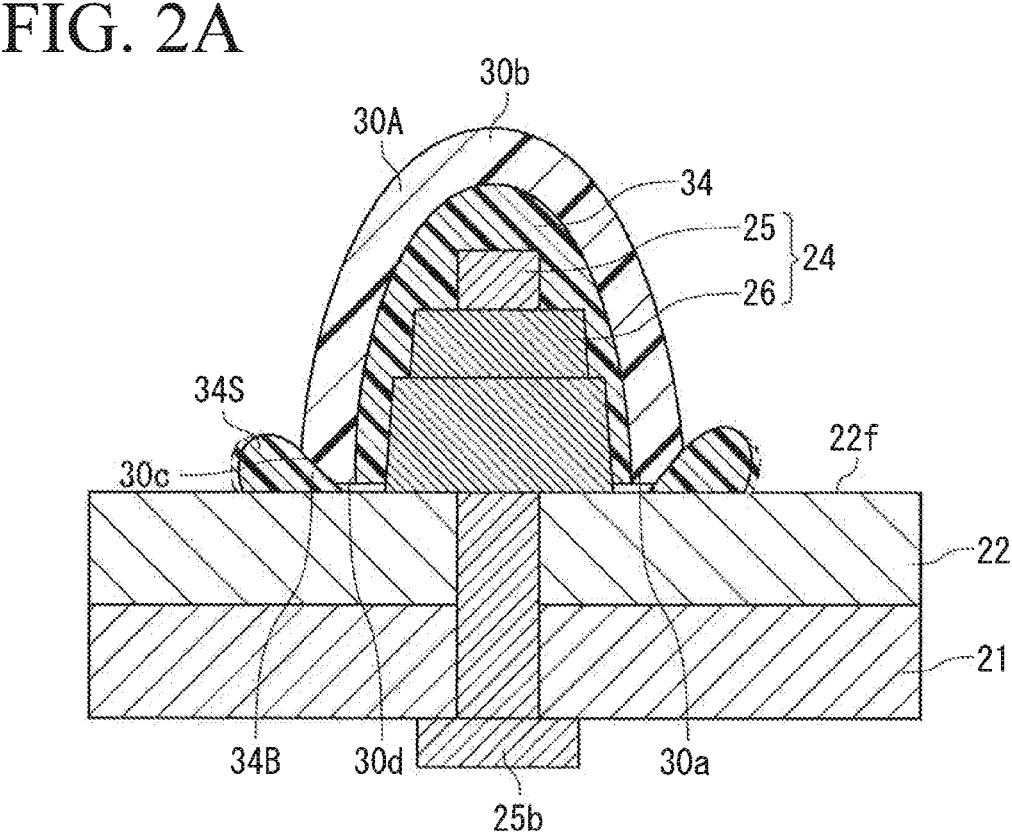
FIG. 2A is a cross-sectional view illustrating a state in which the cap is raised up.

With this arrangement, as shown in FIG. 2A, in the final stage of the mounting process of the cap 30A, even in the case when the cap 30A is pushed back in a direction away from the member 22 due to the pressure and elasticity of the sealant 34 held between the cap 30A and the member 22, since the sealant 34B present between the tapered face 30c and the surface 22f of the member 22 has a sufficient thickness. Therefore, even when the one end part 30a of the cap 30A and the surface 22f of the member 22 is separated from each other, the sealant 34B is hardly discontinued, and the sealant 34B is allowed to absorb the sealant 34S raised into a ring shape on the outer circumferential side thereof, so that the sealant 34 is further hardly discontinued.

Therefore, even when the cap 30A is raised up, an arc can be reliably sealed between the cap 30A and the member 22 so that a lightning protection fastener with high reliability can be prepared.

Figure 2B:
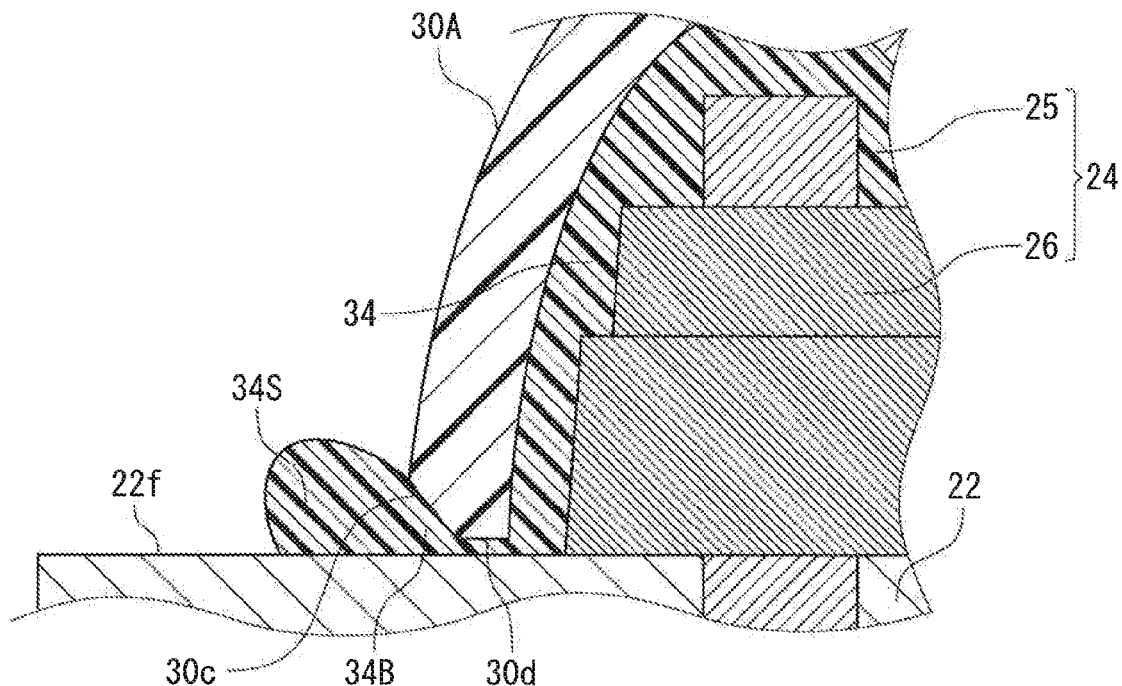
FIG. 2B is a view illustrating a state in which a sealant in a cap and a sealant on an outer circumferential side of the cap are integrally joined.

Moreover, as shown in FIG. 2B, to the sealant 34B present between the tapered face 30c and the surface 22f of the member 22, the ring-shaped sealant 34S located on the outer circumferential side is integrally joined; thus, it becomes possible to prevent the ring-shaped sealant 34S from coming off. Therefore, it is not necessary to shape the sealant 34S which has spilled out toward the outer circumferential side of the cap 30 so that the work can be easily and reliably conducted.

[Second Embodiment]

Next, a second embodiment of the lightning protection fastener and the cap for the lightning protection fastener in accordance with the present invention will be described. The following description will mainly explain structures different from those of the first embodiment, and those structures that are in common with those of the first embodiment are indicated by the same reference numerals and the description thereof will be omitted.

Figure 3A:
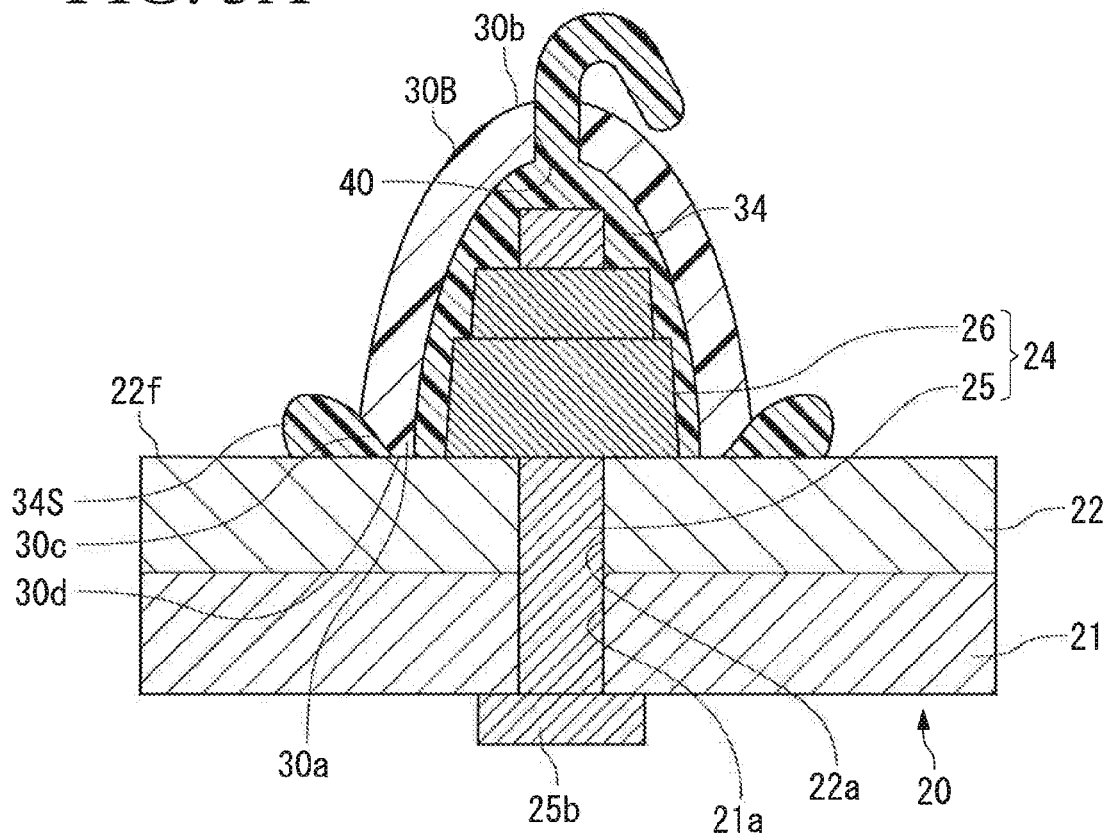
FIG. 3A is a cross-sectional view illustrating a structure of a lightning protection fastener in accordance with a second embodiment.
Figure 3B:
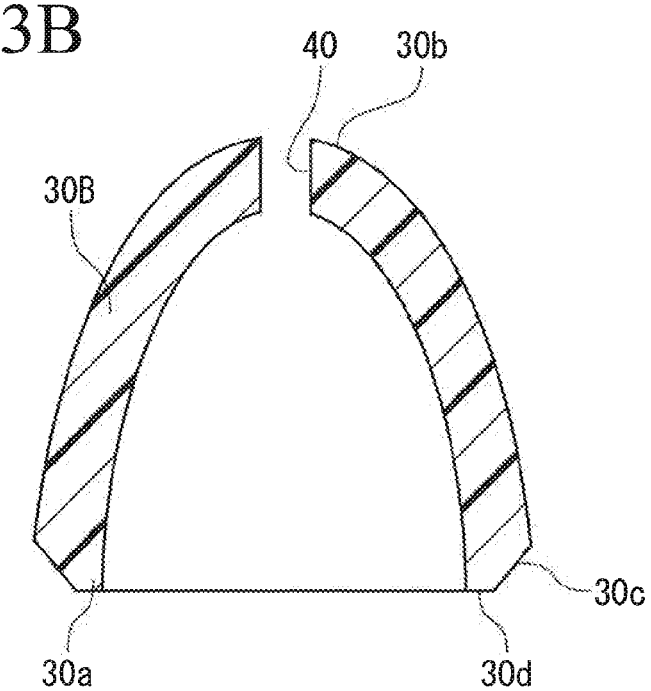
FIG. 3B is a cross-sectional view illustrating a cap in accordance with the second embodiment.

As shown in FIGS. 3A and 3B, although a cap 30B of the present embodiment is formed into the almost same shape by using the same material as that of the cap 30A of the first embodiment, a through-hole 40 is formed on the other end part 30b.

In the cap 30B having such a through-hole 40, in the same manner as in the first embodiment, the cap 30B into which the sealant 34 has been preliminarily filled is positioned to cover the fastener main body 25 of each fastener 24 so as to be mounted on the fastener member 24 that fastens the wing panel 21 and the member 22 with each other.

At this time, the sealant 34 filled into the cap 30B spills out of the opening of the one end part 30a of the cap 30B, and also spills out of the through-hole 40.

With this arrangement, it becomes possible to suppress the pressure of the sealant 34 inside the cap 30B from increasing, and consequently to prevent the cap 30B from being pushed back in a direction away from the member 22. Moreover, in the case when the cap 30B is pushed back, the sealant 34 filled inside the cap 30B spills out of the opening on the one end part 30a of the cap 30B in the same manner as in the first embodiment. The spilled-out sealant 34 is present respectively between the plane 30d of the one end part 30a of the cap 30B and the surface 22f of the member 22, as well as between the tapered face 30c and the surface 22f of the member 22. Moreover, the sealant 34 is spread out in a ring shape on the outer circumferential side of the one end part 30a of the cap 30B so as to be raised to a position higher than the tapered face 30c on the surface 22f of the member 22. Thus, in the same manner as in the first embodiment, even when the cap 30B is raised above, an arc can be reliably sealed between the cap 30B and the member 22 so that a lightning protection fastener with high reliability can be prepared.

In this case, the through-hole 40 may have a fixed diameter from the inside toward the outside of the cap 30B, or may be designed to have a narrowed inner diameter on the inner side or the outer side, or on the intermediate portion or the like.

[Third Embodiment]

The following description will discuss a third embodiment of the lightning protection fastener and the cap of the lightning protection fastener in accordance with the present invention. The following description will mainly explain structures different from those of the first embodiment, and those structures that are in common with those of the first embodiment are indicated by the same reference numerals and the description thereof will be omitted.

Figure 4:
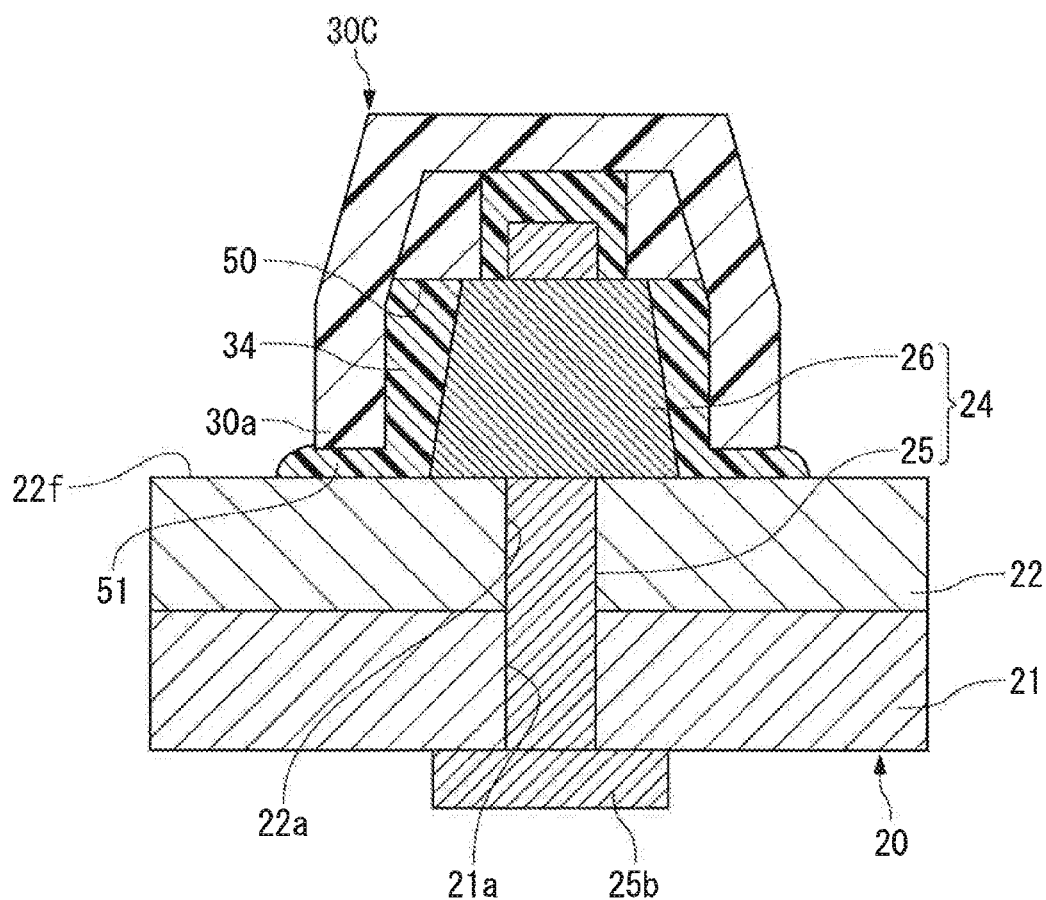
FIG. 4 is a cross-sectional view illustrating a structure of a lightning protection fastener and a cap in accordance with a third embodiment.
Figure 5A:
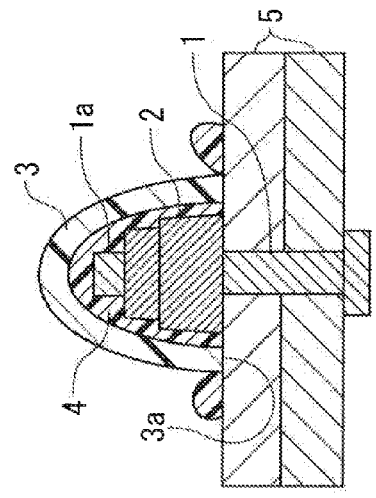
FIGS. 5A to 5E are cross-sectional views illustrating a conventional lightning protection fastener.
Figure 5B:
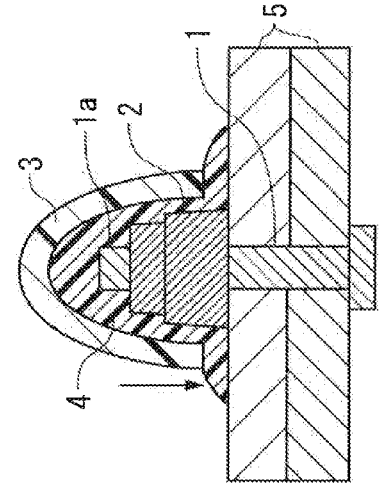
Figure 5C:
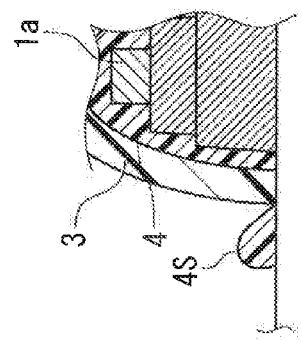
Figure 5D:
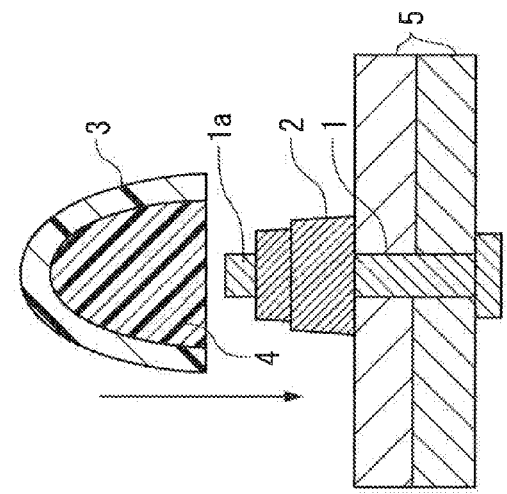
Figure 5E:
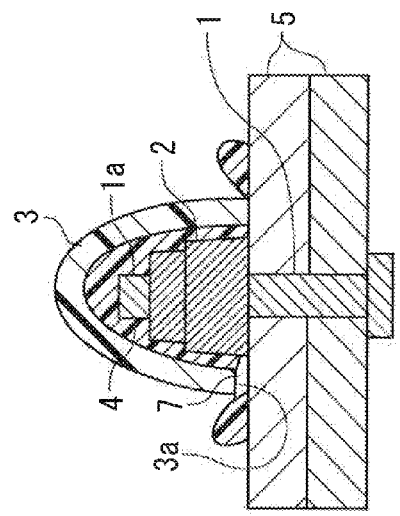

As shown in FIG. 4, a cap 30C of the present embodiment includes a stepped portion (abut portion) 50 formed on the inside thereof, which abuts against the collar 26 to be fastened with the fastener member 24. The dimension of the stepped portion 50 is designed such that in a state where the stepped portion 50 abuts against the collar 26, a clearance 51 is formed between the one end part 30a of the cap 30C and the surface 22f of the member 22.

In accordance with this arrangement, in the same manner as in the first embodiment, the cap 30C into which the sealant 34 has been preliminarily filled is pressed onto the fastener main body 25 of each fastener 24 so as to be mounted on the fastener member 24 that fastens the wing panel 21 and the member 22 with each other.

At this time, since the stepped portion 50 of the cap 30C abuts against the collar 26, the amount of insertion of the cap 30C is regulated. In a state where the stepped portion 50 abuts against the collar 26, a clearance 51 is formed between the one end part 30a of the cap 30C and the member 22. Therefore, when the sealant 34 filled in the cap 30C spills out of the opening of the one end part 30a of the cap 30C as the cap 30C is pushed, the sealant 34 is spread out toward the outer circumferential side through the clearance 51 between the one end part 30a of the cap 30C and the member 22.

With this arrangement, it becomes possible to suppress the pressure of the sealant 34 inside the cap 30C from increasing, and consequently to prevent the cap 30C from being pushed back in a direction away from the member 22. Moreover, the clearance 51 is formed between the one end part 30a and the member 22, and the sealant 34 is filled therein; therefore, even in the case when the cap 30C is pushed back, an arc can be reliably sealed between the cap 30C and the member 22 so that a lightning protection fastener with high reliability can be prepared.

In the above-mentioned embodiment, an arrangement is made so as to fasten the wing panel 21 and the member 22 with each other by a fastener member 24. However, the fastener member 24 and the caps 30A, 30B and 30C may be applied at any other positions. Moreover, the fastener main body 25 of the fastener member 24 may protrude from the two surface sides of two members so that caps 30A, 30B and 30C may be provided on the two surface sides.

Furthermore, the outer shapes of the cap 30A, 30B and 30C may be any shapes.

In the first and second embodiments, the tapered face 30c is designed to be continuously formed in a circumferential direction; however, a plurality of tapered surfaces 30c may be formed intermittently in the circumferential direction.

Moreover, on the outer airframe surface side of the wing 20 also, a cap having the same tapered face as that of the caps 30A to 30C of the above-mentioned embodiments may be put so as to cover the enlarged diameter portion 25b of the fastener main body 25 forming the fastener member 24, with a sealant being filled between the cap and the enlarged diameter portion 25b; thus, this sealant may be filled between the tapered face of the cap portion and the outside surface of the wing 20.

In addition to these arrangements, the structures described in the above embodiments can be selected or can be changed as appropriate to another structure without departing from the gist of the present invention.

REFERENCE SIGNS LIST

20 Wing
21 Wing panel (first member)
21a Hole
22 Member (second member)
22a Surface
24 Fastener member
25 Fastener main body
26 Collar
30A, 30B, 30C Cap
30a One end part
30b The other end part 30c Tapered face
30d Plane
34 Sealant
40 Through-hole
50 Stepped portion (abut portion)
51 Clearance

What is claimed is:

1. A lightning protection fastener assembly comprising:
a fastener member having a shaft that penetrates a first member and a second member so as to fasten the second member to the first member that constitutes an airframe of an aircraft, the shaft protruding toward at least one of the sides of the first member and the second member;
a cap, made of an insulating material, that is attached so as to cover the shaft of the fastener member that protrudes toward at least one of the sides of the first member and the second member; and
a sealant, made of an insulating material, that is filled into the cap to seal a space between the cap and the fastener member so that the shaft of the fastener member is covered with the sealant,
wherein the cap has an opening that accommodate the shaft of the fastener member,
an end part of the cap on the opening side, the end part facing the first member or the second member, comprises
a plane orthogonal to an axis line of the cap and
a tapered face formed on an outer circumferential side of the plane; and
wherein the sealant is filled between the tapered face and a surface of the first member, or between the tapered face and a surface of the second member.

2. The lightning protection fastener assembly according to claim 1, wherein the cap has a through-hole that penetrates the inside and outside of the cap and the through-hole is formed on another end part that is opposed to the opening.

3. The lightning protection fastener assembly according to claim 1 or claim 2, wherein the shaft protrudes toward both sides of the first member and the second member, and the cap is provided on each of one end portion and another end portion of the shaft.

4. The lightning protection fastener assembly according to claim 1, wherein the cap is composed of one component.

5. The lightning protection fastener assembly according to claim 1, wherein the sealant is in direct contact with the shaft of the fastener member.

6. A lightning protection fastener assembly comprising:
a fastener member having a shaft that penetrates a first member and a second member so as to fasten the second member to the first member that constitutes an airframe of an aircraft, the shaft protruding toward at least one of the sides of the first member and the second member;
a cap, made of an electrical insulating material, that is attached so as to cover the shaft of the fastener member that protrudes toward at least one of the sides of the first member and the second member; and
a sealant, made of an electrical insulating material, that is filled into the cap to seal a space between the cap and the fastener member,
wherein the cap has an abut portion that abuts against the fastener member or a fastening member that is fastened to the fastener member, and
a clearance is formed between the cap and a surface of the first member or between the cap and a surface of the second member while the abut portion abuts against the fastener member or the fastening member, so that the sealant is filled in the clearance.

7. The lightning protection fastener assembly according to claim 6, wherein the shaft of the fastener member is covered with the sealant.

8. The lightning protection fastener assembly according to claim 6, wherein the cap is composed of one component.

9. The lightning protection fastener assembly according to claim 6, wherein the abut portion regulates an amount of insertion of the fastener member into the cap.

10. A cap for a lightning protection fastener to be attached so as to cover a tip of a fastener member that fastens a first member and a second member with each other,
wherein the cap is made of an insulating material and comprises an opening for accommodating the tip of the fastener member, and
an end part of the cap on the opening, wherein the end part is adapted for facing the first member or the second member, and the end part comprises
a plane orthogonal to an axis line of the cap and
a tapered face formed on an outer circumferential side of the plane,
wherein the cap is composed of one component and the plane and the tapered face are continuously formed,
wherein the cap has a through-hole that penetrates the inside and outside of the cap and the through-hole is formed on another end part that is opposed to the opening.

11. A cap for a lightning protection fastener to be attached so as to cover a tip of a fastener member that fastens a first member and a second member with each other,
wherein the cap is made of an insulating material and comprises an opening for accommodating the tip of the fastener member, and
an end part of the cap on the opening, wherein the end part is adapted for facing the first member or the second member, and the end part comprises
a plane orthogonal to an axis line of the cap and
a tapered face formed on an outer circumferential side of the plane,
wherein the cap is composed of one component and the plane and the tapered face are continuously formed,
wherein when the cap is viewed on a cross section taken along an axis line of the cap, the tapered face has a linear shape.

* * * * *